United States Patent
Han et al.

(10) Patent No.: US 7,139,048 B2
(45) Date of Patent: Nov. 21, 2006

(54) BACKLIGHT ASSEMBLY AND LIQUID CRYSTAL DISPLAY APPARATUS COMPRISING A LIGHT GUIDE PLATE HAVING LIGHT SOURCE RECEIVING RECESS AND LIGHT GUIDING RECESS

(75) Inventors: Byung-Woong Han, Incheon (KR); Kyu-Seok Kim, Yongin-si (KR); Young-Bee Chu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 48 days.

(21) Appl. No.: 10/843,726

(22) Filed: May 12, 2004

(65) Prior Publication Data

US 2005/0001952 A1 Jan. 6, 2005

(30) Foreign Application Priority Data

Jul. 1, 2003 (KR) .................... 10-2003-0044404

(51) Int. Cl.
*G02F 1/1335* (2006.01)
*F21V 7/04* (2006.01)

(52) U.S. Cl. .................... 349/62; 349/65; 349/61; 362/612; 362/615; 362/613; 362/621

(58) Field of Classification Search ............... 362/612, 362/617, 628, 629, 606, 613, 621; 349/62, 349/65
See application file for complete search history.

(56) References Cited

U.S. PATENT DOCUMENTS 6,474,826 B1 * 11/2002 Tanaka et al. .............. 362/612
2004/0207775 A1 * 10/2004 Min et al. .................... 349/65

FOREIGN PATENT DOCUMENTS

JP        06051130 A  *  2/1994

OTHER PUBLICATIONS

Machine-translated copy of JP 06-051130.*

* cited by examiner

*Primary Examiner*—Andrew Schechter
*Assistant Examiner*—W. Patty Chen
(74) *Attorney, Agent, or Firm*—Cantor Colburn LLP

(57) ABSTRACT

In a backlight assembly and a liquid crystal display apparatus having the same, the backlight assembly includes a light emitting diode that emits light and a light guide plate that supplies the light to a liquid crystal display panel. The light guide plate includes a guide recess formed at a first end thereof so as to guide the light emitted from the light emitting diode to a second end opposite the first end of the light guide plate. Thus, the light guide plate may prevent leakage of the light therefrom, thereby improving display quality of the liquid crystal display apparatus.

24 Claims, 7 Drawing Sheets

BACKLIGHT ASSEMBLY AND LIQUID CRYSTAL DISPLAY APPARATUS COMPRISING A LIGHT GUIDE PLATE HAVING LIGHT SOURCE RECEIVING RECESS AND LIGHT GUIDING RECESS

BACKGROUND OF THE INVENTION

1. Field of the Invention

The present invention relates to a backlight assembly and a liquid crystal display apparatus having the backlight assembly. More particularly, the present invention relates to a backlight assembly capable of improving display quality and a liquid crystal display apparatus having the backlight assembly.

2. Description of the Related Art

In general, a liquid crystal display apparatus includes a liquid crystal display panel that displays an image using a light and a backlight assembly that generates the light and supplies the light to the liquid crystal display panel.

The backlight assembly includes a light source such as a cold cathode fluorescent lamp (CCFL) and a light emitting diode (LED) so as to generate the light.

The LED is a kind of point light source having a light emitting area smaller than that of the CCFL. The light emitted from the LED is incident into a first side surface of a light guide plate of the backlight assembly, and the light guide plate changes the light into a planar light to supply the planar light to the liquid crystal display panel. The light from the LED may be emitted in a direction inclined with respect to the first side surface, or in a direction substantially parallel to the first side surface.

The light emitted in the direction inclined with respect to the first side surface is incident into the light guide plate through the first side surface, and then the light is supplied to the liquid crystal display panel. However, the light emitted in the direction substantially parallel to the first side surface is not incident into the first side surface of the light guide plate.

As a result, an amount of the light supplied to the liquid crystal display panel from the LED may be reduced, thereby deteriorating display quality of the liquid crystal display panel.

BRIEF SUMMARY OF THE INVENTION

The present invention provides a backlight assembly capable of improving light efficiency and display quality.

The present invention also provides a liquid crystal display apparatus having the above backlight assembly.

In one aspect of the present invention, a backlight assembly includes a light source that emits light, and a light guide plate that receives the light source. The light guide plate includes a receiving portion formed at a first end of the light guide plate so as to receive the light source, and a guide portion formed at a position adjacent to the receiving portion so as to guide a portion of the light emitted from the light source to a second end that is opposite to the first end. The portion of the light is substantially parallel to the first end of the light guide plate when emitted from the light source.

In another aspect of the present invention, a backlight assembly includes a light source that emits a first light and a second light, and a light guide plate that receives the light source. The light guide plate includes a receiving recess formed at a first end thereof so as to receive the light source, and a guide recess formed at a position adjacent to the receiving recess so as to guide the second light to a second end opposite to the first end of the light guide plate. The first light is provided to the second end of the light guide plate, and the second light is provided to the second end of the light guide plate after reflected from the guide recess.

In still another aspect of the invention, a liquid crystal display apparatus includes a liquid crystal display panel that receives light and displays an image using the light, and a backlight assembly that provides the light to the liquid crystal display panel. The backlight assembly includes a light source that emits light, and a light guide plate that guides the light to the liquid crystal display panel.

The light guide plate includes a receiving portion formed at a first end of the light guide plate so as to receive the light source, and a guide portion formed at a position adjacent to the receiving portion so as to guide a portion of the light emitted from the light source to a second end opposite to the first end of the light guide plate to provide the guided portion of the light to the liquid crystal display panel. The portion of the light is substantially parallel to the first end of the light guide plate when emitted from the light source.

In still another aspect of the invention, a liquid crystal display apparatus includes a liquid crystal display panel that receives a first light and a second light and displays an image using the first light and the second light, and a backlight assembly that supplies the first and second lights to the liquid crystal display panel.

The backlight assembly includes a light source that emits the first light and the second light, and a light guide plate that guides the first and second lights to the liquid crystal display panel. The light guide plate includes a receiving recess formed at a first end thereof so as to receive the light source, and a guide recess formed at a position adjacent to the receiving recess so as to guide the first light and the second light to the liquid crystal display panel. The first light is provided to the second end opposite to the first end of the light guide plate, and the second light is provided to the second end of the light guide plate after reflected from the guide recess.

According to the backlight assembly and the liquid crystal display apparatus having the same, the light guide plate may prevent leakage of the light emitted from the light source, thereby improving display quality of the liquid crystal display apparatus.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Hereinafter, the present invention will be explained in detail with reference to the accompanying drawings.

Figure 1:
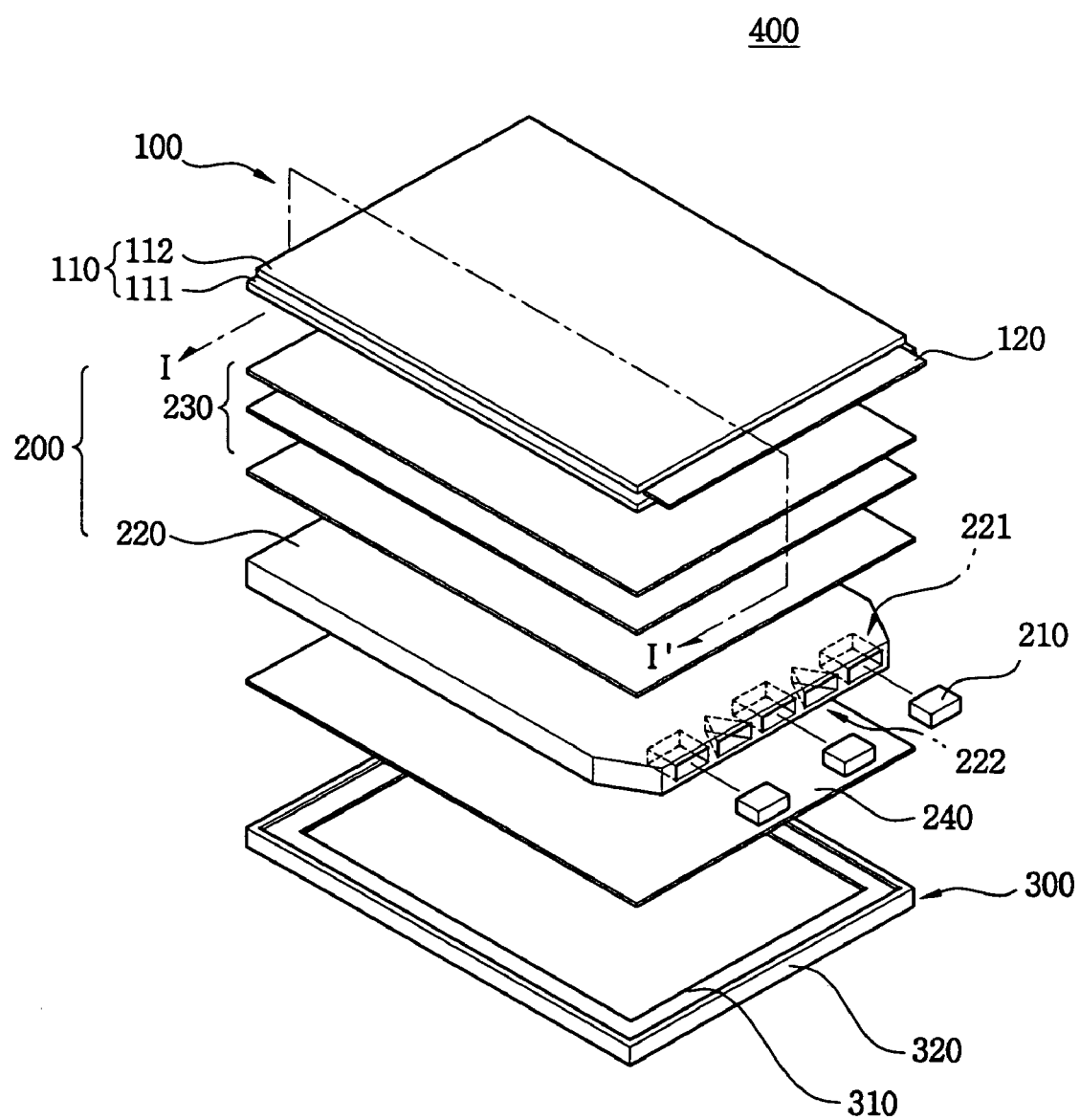
FIG. 1 is an exploded perspective view showing a liquid crystal display apparatus according to an exemplary embodiment of the present invention.

FIG. 1 is an exploded perspective view showing a liquid crystal display apparatus according to an exemplary embodiment of the present invention.

Referring to FIG. 1, a liquid crystal display apparatus 400 includes a display unit 100 that displays an image using light, a backlight assembly 200 that generates the light and supplies the light to the display unit 100, and a mold frame 300 that receives the backlight assembly 200 and the display unit 100.

Particularly, the display unit 100 includes a liquid crystal display panel 110 that displays the image and a first flexible printed circuit board 120 that receives an image signal and provides the image signal to the liquid crystal display panel 110.

The liquid crystal display panel 110 includes a thin film transistor (TFT) substrate 111, a color filter substrate 112 combined with the TFT substrate 111, and a liquid crystal layer (not shown) disposed between the TFT substrate 111 and the color filter substrate 112.

The TFT substrate 111 is a transparent substrate on which TFTs (not shown) are formed as in a matrix configuration. The color filter substrate 112 is also a transparent substrate on which red (R), green (G) and blue (B) color pixels are formed by a thin film process.

The TFT substrate 111 includes a plurality of data driving chips (not shown) attached to a source side thereof so as to provide a data signal to the TFT substrate 111. The TFT substrate 111 also includes a plurality of gate driving chips (not shown) attached to a gate side thereof so as to provide a gate signal to the TFT substrate 111. The data and gate driving chips applies a driving signal and a timing signal to the TFT substrate 111 in response to the image signal so as to control driving and driving timing of the TFT substrate 111.

The first flexible printed circuit board 120 is attached to the source side of the TFT substrate 111. The first flexible printed circuit board 120 is electrically connected to the data and gate driving chips so as to apply the image signal.

The backlight assembly 200 is disposed under the display unit 100 so as to uniformly provide the light to the liquid crystal display panel 110.

The backlight assembly 200 includes a plurality of lamps 210 that generates the light, a light guide plate 220 that receives the lamps 210 and provides the light to the liquid crystal display panel 110, optical sheets 230 disposed between the light guide plate 220 and the display unit 100 so as to allow the light from the light guide plate 220 to be uniform, and a reflecting plate 240 disposed under the light guide plate 220 so as to reflect the light leaked from the light guide plate 220 to the light guide plate 220.

The lamps 210 are inserted into a first end of the light guide plate 220 to provide the light to the light guide plate 220. The lamps 210 include a plurality of light emitting diodes. A second flexible printed circuit board (not shown) that controls the lamps 210 is disposed at a position adjacent to the lamps 210.

In this exemplary embodiment, the lamps 210 include a first lamp, a second lamp and a third lamp, and number of the lamps 210 depends upon a size of the liquid crystal display panel 110.

The light guide plate 220 further includes a light guide pattern (not shown) formed at a light guide area corresponding to a display area of the liquid crystal display panel 110. The light guide pattern (not shown) guides the incident light to the display area of the liquid crystal display panel 110.

The light guide plate 220 includes a plurality of receiving recesses 221 into which the lamps are received and a plurality of guide recesses 222 that guides the light from the lamps 210 to the light guide area. The receiving recesses 221 and the guide recesses 222 are formed at the first end of the light guide plate 220. In order to form the receiving recesses 221 and the guide recesses 222, the first end of the light guide plate 220 is partially recessed.

In this exemplary embodiment, the receiving recesses 221 include a first receiving recess, a second receiving recess and a third receiving recess, and the guide recesses 222 include a first guide recess and a second guide recess. Number of the receiving recesses 221 and number of the guide recesses 222 may be varied according to number of the lamps 210.

The optical sheets 230 are disposed between the light guide plate 220 and the liquid crystal display panel 110. The optical sheets 230 enhances optical properties of the light emitted from the light guide plate 220, and provides the light to the liquid crystal display panel 110.

The reflecting plate 240 is disposed under the light guide plate 220. The reflecting plate 240 reflects the light leaked from the light guide plate 220 back to the light guide plate 220, thereby enhancing the light efficiency.

The backlight assembly 200 and the liquid crystal display panel 110 are received into the mold frame 300. The mold frame 300 includes a bottom surface 310 partially opened and a sidewall 320 extended from the bottom surface. The backlight assembly 200 and the liquid crystal display panel 110 are successively received onto the bottom surface, and the first flexible printed circuit board 120 is outwardly bent toward a rear surface of the mold frame 300.

Figure 2:
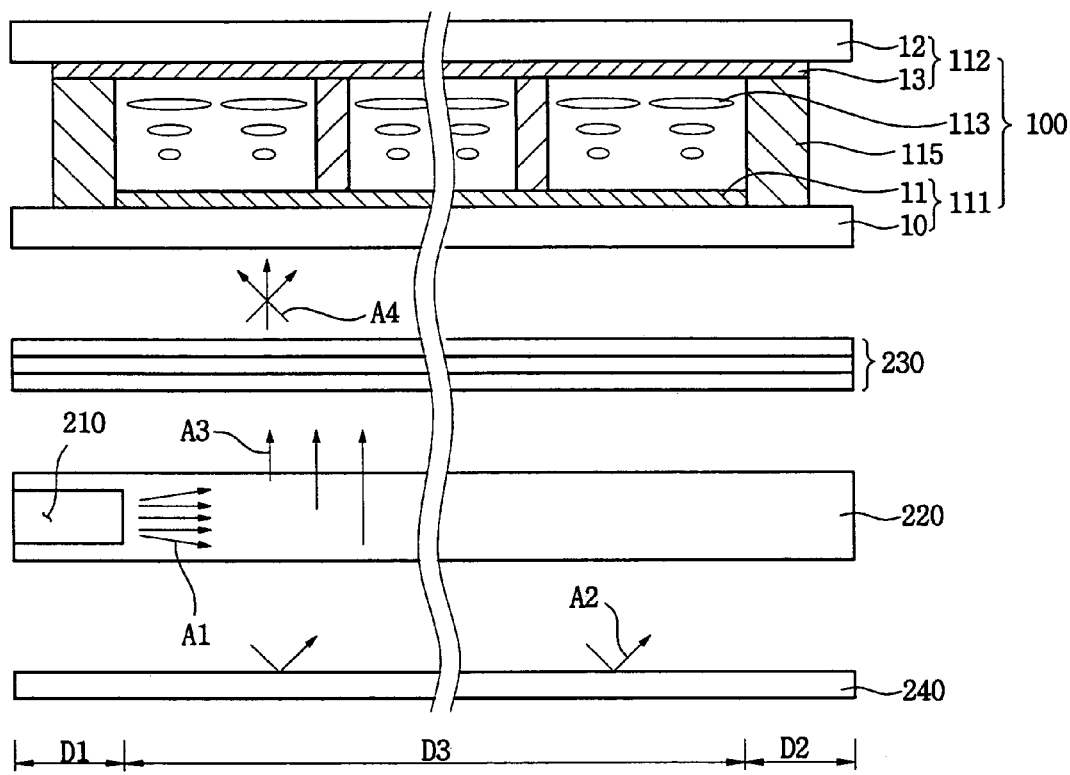
FIG. 2 is a cross-sectional view taken along the line I–I' in FIG. 1.

FIG. 2 is a cross-sectional view taken along the line I–I' in FIG. 1. In FIG. 2, in order to clearly show a path of the light emitted from the lamps 210 shown in FIG. 1, the first flexible printed circuit board 120 and the mold frame 300 are omitted.

Referring to FIG. 2, a light A1 emitted from the lamps 210 received into the receiving recesses 221 formed at the first end D1 of the light guide plate 220 advances toward a second end D2 of the light guide plate 220 opposite to the first end D1.

The light guide pattern formed in the light guide area D3 between the first and second ends D1 and D2 of the light guide plate 220 varies the path of the light A1 such that the light A1 is provided to the optical sheets 230 disposed on the light guide plate 220. A portion of the light A1 may be partially leaked from the light guide plate 220 while the light A1 passes through the light guide area D3. The leaked light A1 is reflected by the reflecting plate 240 disposed under the light guide plate 220, so that the reflected light A1 is incident back into the light guide plate 220.

The optical sheets 230 enhance light properties of a light A3 from the light guide plate 220, such as brightness, uniformity, etc., and provides the light A3 to the liquid crystal display panel 110 as a light A4. The optical sheets 230 may include various optical sheets, such as a diffusion sheet that diffuses the light A3 from the light guide plate 220, a prism sheet that condenses the diffused light and so on.

Hereinafter, incident paths of the light A1 emitted from the lamps 210 will be explained in detail with reference to the accompanying drawings.

Figure 3:
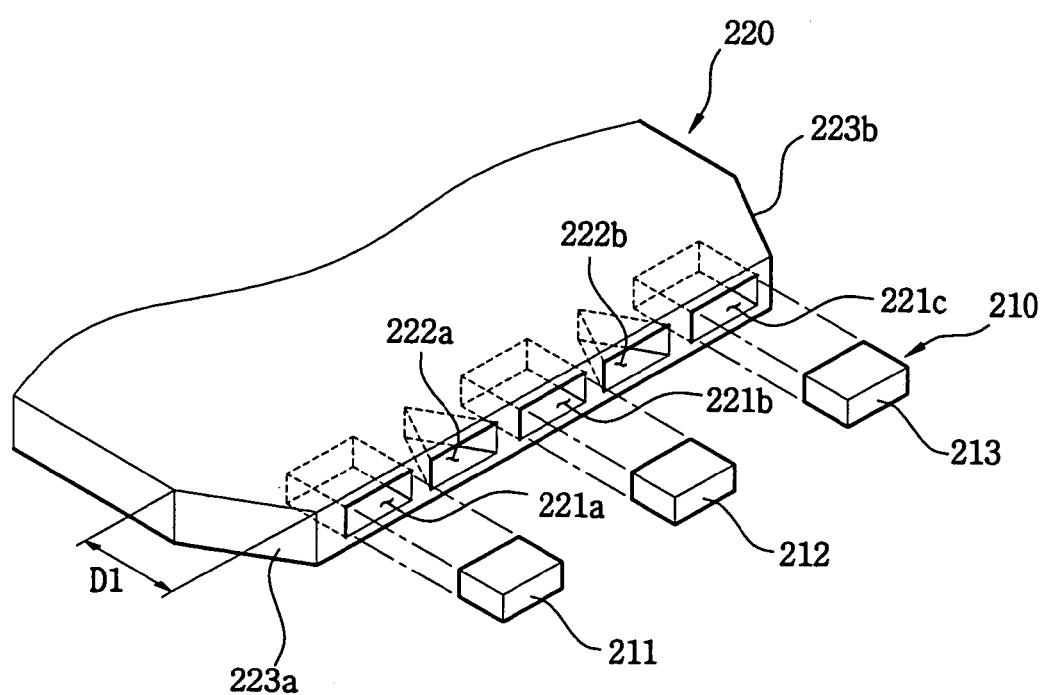
FIG. 3 is a perspective view showing the light guide plate and the light emitting diode shown in FIG. 1.
Figure 4:
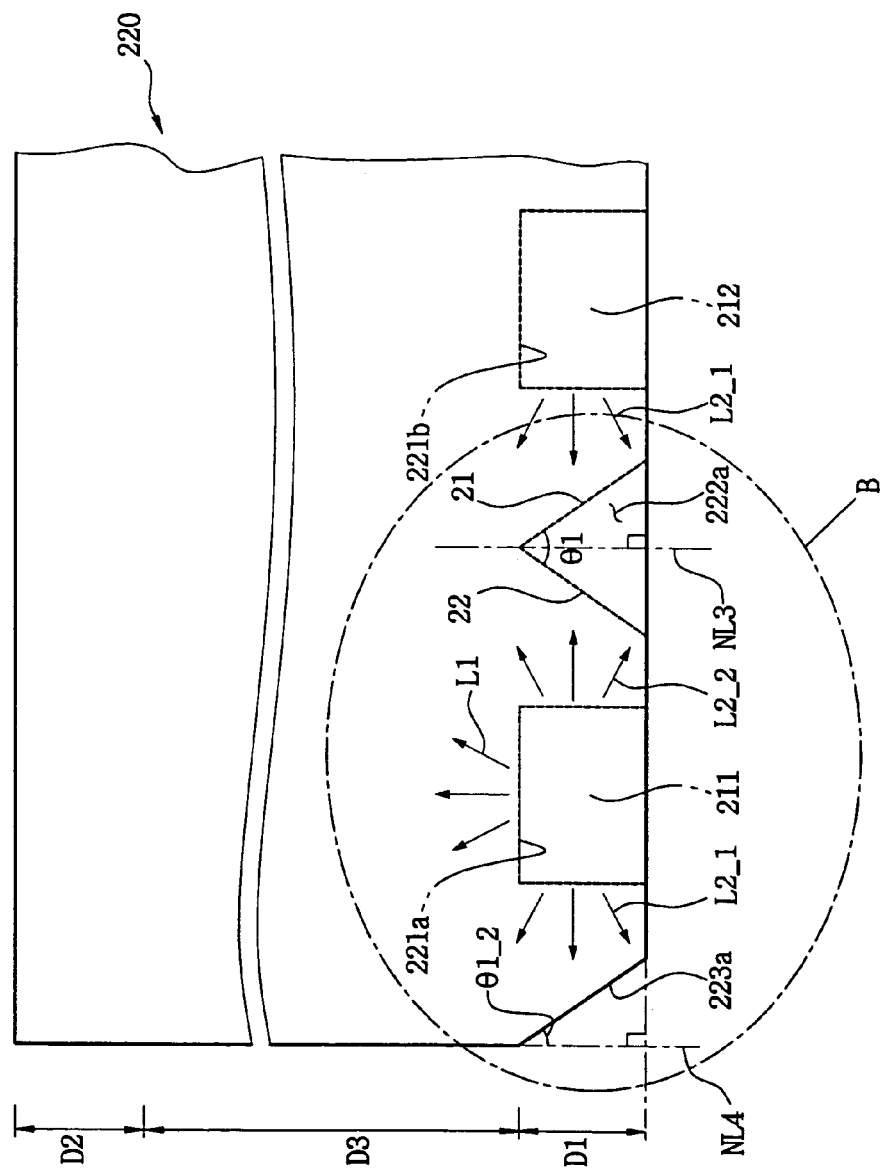
FIG. 4 is a plan view showing the light guide plate shown in FIG. 3.

FIG. 3 is a perspective view showing the light guide plate and the light emitting diode shown in FIG. 1. FIG. 4 is a plan view showing the light guide plate shown in FIG. 3.

Referring to FIGS. 3 and 4, the first end D1 of the light guide plate 220 is partially recessed by a predetermined depth toward the light guide area D3 to form the first, second and third receiving recesses 221a, 221b and 221c at the first end D1. Portions between the first, second and third receiving recesses 221a, 221b and 221c of the light guide plate 220 are also partially recessed to form the first and second guide recesses 222a and 222b.

Particularly, the first, second and third lamps 211, 212 and 213 are received into the first, second and third receiving recesses 221a, 221b and 221c, respectively. The first guide recess 222a is formed between the first and second receiving recesses 221a and 221b, and the second guide recess 222b is formed between the second and third receiving recess 221b and 221c. The first and second guide recesses 222a and 222b guide the light emitted from the first, second and third lamps 211, 212 and 213 to the light guide area D3 of the light guide plate 220.

In this exemplary embodiment, the first and second guide recesses 222a and 222b are substantially identical to each other. Thus, the first guide recess 222a will be explained in detail, and a detailed description of the second guide recess 222b will be omitted.

In order to guide the light emitted from the first and second lamps 211 and 212 to the light guide area D3 of the light guide plate 220, the first guide recess 222a includes a first inclined surface 21 and a second inclined surface 22. The first and second inclined surfaces 21 and 22 are inclined by a predetermined angle with respect to the first end D1, and connected to each other. The first and second inclined surfaces 21 and 22 of the first guide recess 222a reflects the light emitted from the first and second lamps 211 and 212 such that the light emitted from the first and second lamps 211 and 212 is guided to the light guide area D3 of the light guide plate 220.

The first inclined surface 21 of the first light guide recess 222a is disposed at a position adjacent to the second receiving recess 221a so as to guide the light emitted from the second lamp 212 to the light guide area D3. The second inclined surface 22 is disposed at a position adjacent to the first receiving recess 221a so as to guide the light emitted from the first lamp 211 to the light guide area D3.

Both corners of the first end D1 of the light guide plate 220 are chamfered so as to form a first guide surface 223a and a second guide surface 223b substantially parallel to the first and second inclined surfaces 21 and 22, respectively. The first and second guide surfaces 223a and 223b reflect the light emitted from the first and third lamps 211 and 213 to the light guide area D3 of the light guide plate 220 as the first and second inclined surfaces 21 and 22 reflect the light emitted from the first and second lamps 211 and 212 to the light guide area D3.

The first guide surface 233a is formed at a position adjacent to the first receiving recess 221a. The first guide surface 233a reflects the light emitted from the first lamp 211 so as to allow the light emitted from the first lamp 211 to be guided to the light guide area D3 of the light guide plate 220. The second guide surface 233b is formed at a position adjacent to the third receiving recess 221c. The second guide surface 233b reflects the light emitted from the third lamp 213 so as to allow the light emitted from the third lamp 213 to be guided to the light guide area D3 of the light guide plate 220.

Especially, the first and second guide surfaces 223a and 223b guide the light emitted to both sides of the first end D1 from the first and second lamps 211 and 213 to the light guide area D3 of the light guide plate 220.

Figure 5:
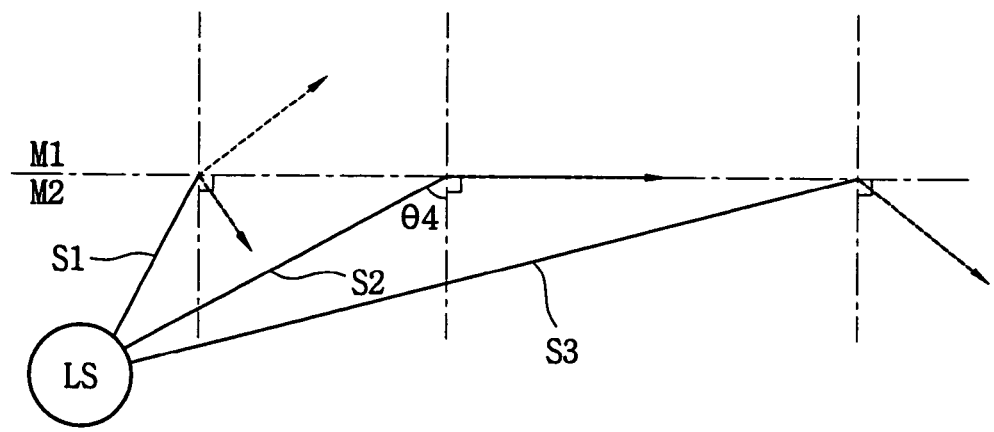
FIG. 5 is a schematic view illustrating a total reflection principle.
Figure 6:
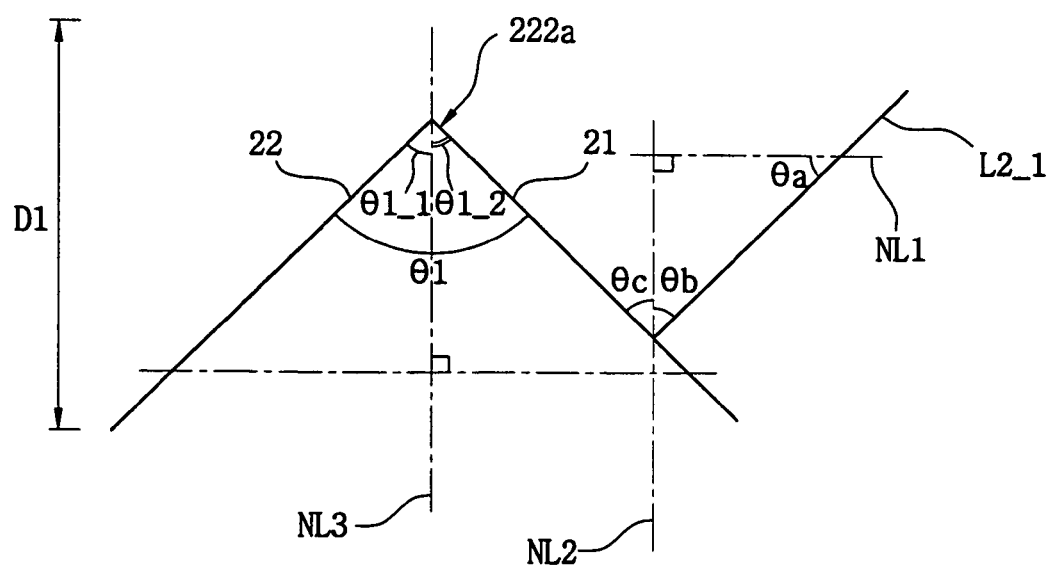
FIG. 6 is a schematic view illustrating an angle of the guide recess shown in FIG. 3.

FIG. 5 is a schematic view illustrating a total reflection principle. FIG. 6 is a schematic view illustrating an angle of the guide recess shown in FIG. 3. In this exemplary embodiment, functions of the first, second and third lamps 211, 212 and 213 are substantially identical to each other, functions of the first and second guide surfaces 223a and 223b are substantially identical to each other, functions of the first, second and third receiving recesses 221a, 221b and 221c are substantially identical to each other, and functions of the first and second guide recesses 222a and 222b are substantially identical to each other. Thus, in FIGS. 4 to 6, the first lamp 211, the first guide surface 223a, the first receiving recess 211 and the first guide recess 222a will be explained in detail.

Referring to FIG. 4, the lights L1, L2_1 and L2_2 emitted from the first lamp 211 are advanced toward multiple directions. The lights L1, L2_1 and L2_2 include a first light L1 emitted towards the second end D2 of the light guide plate 220, a second light L2_1 emitted towards the first guide surface 223a, and a third light L2_2 emitted towards the second guide surface 223b (see FIG. 3).

The first guide recess 222a reflects the second and third lights L2_1 and L2_2 to the light guide area D3 of the light guide plate 220 so as to prevent leakage of the second and third lights L2_1 and L2_2 from the light guide plate 220.

Particularly, the first inclined surface 21 of the first guide recess 222a formed at a position adjacent to the second receiving recess 221b reflects the second light L2_1 emitted from the second lamp 212 such that the second light L2_1 is guided to the light guide area D3. Also, the second inclined surface 22 of the first guide recess 222a formed at a position adjacent to the first receiving recess 221a reflects the third light L2_2 emitted from the first lamp 211 such that the third light L2_2 is guided to the light guide area D3.

The second light L2_1 emitted from the first lamp 211 is guided to the light guide area D3 of the light guide plate 220 by the first guide surface 223a, and the third light (not shown) is guided to the light guide area D3 of the light guide plate 220 by the second guide surface 223b.

Although not shown in FIG. 4, the second guide recess 222b is positioned between the second and third receiving recesses 211b and 211c. Thus, first and second inclined surfaces (not shown) of the second guide recess 222b reflect the third light L2_2 emitted from the second lamp 212 and the second light L2_1 emitted from the third lamp 213, respectively, such that the third and second lights L2_2 and L2_1 are guided to the light guide area D3 of the light guide plate 220.

The first inclined surface 21 and the second inclined surface 22 of the first guide recess 221a are inclined in a predetermined angle with respect to each other. Due to an angle at a position that the first inclined surface 21 meets the second inclined surface 22, an amount of the second light L2_1 emitted from the second lamp 212 and an amount of the third light L2_2 emitted from the first lamp 211, which are guided to the light guide area D3, may be different. This is because of a refraction phenomenon that a speed of a light varies due to a medium through which the light passes.

In general, a light is refracted when passing through mediums different from each other. A refraction angle of the light at a boundary between the mediums different from each other depends upon an incident angle of the light.

As shown in FIG. 5, in case that a light is incident into a first medium M1 from a second medium M2, a first incident light S1, a second incident light S2 and a third incident light S3 are partially refracted at a boundary between the first and second mediums M1 and M2. Thus, the refracted portions of the first, second and third incident lights S1, S2 and S3 are incident into the first medium M1, and remained portions of the first, second and third incident lights S1, S2 and S3 are reflected from the boundary between the first and second mediums M1 and M2. In this exemplary embodiment, the first medium M1 has a refractive index different from that of the second medium M2, and the second medium M2 has a refractive index higher than that of the first medium M1.

In case that the first, second and third incident lights S1, S2 and S3 are incident into the first medium M1 from the second medium M2, the first, second and third incident lights S1, S2 and S3 have a refracted angle of about 90 degrees according to the incident angle. In case of the refracted angle of about 90 degrees, the first, second and third incident light S1, S2 and S3 are not incident into the first medium M1 and entirely reflected to the second medium M2. That is, the first, second and third incident lights S1, S2 and S3 are totally reflected at the boundary between the first and second mediums M1 and M2 when the incident angle of the first, second and third incident lights S1, S2 and S3 is greater than a critical angle.

As shown in FIG. 5, the first incident light S1 is incident into the second medium M2 at an incident angle smaller than a critical angle $\theta 4$, so that a portion of the first incident light S1 is reflected at the boundary between the first and second mediums M1 and M2, and a remained portion of the first incident light S1 is incident into the first medium M1 after refracted by a predetermined angle. The second incident light S2 has an incident angle substantially identical to the critical angle $\theta 4$, and the third incident light S3 has an incident angle greater than the critical angle $\theta 4$. Thus, the second and third incident lights S2 and S3 are not incident into the first medium M1, and reflected at the boundary between the first and second mediums M1 and M2.

When the third light L2_2 emitted from the first lamp 211 and the second light L2_1 emitted from the second lamp 212 are incident through the second and first inclined surfaces 22 and 21 of the first guide recess 222a, respectively, the third light L2_2 emitted from the first lamp 211 and the second light L2_1 emitted from the second lamp 212 may be leaked outside the light guide plate 220 due to reflection from an internal air space in the first guide recess 222a. A first angle $\theta 1$ at a position that the first inclined surface 21 meets the second inclined surface 22 is determined in consideration of the total reflection principle so as to prevent the third light L2_2 emitted from the first lamp 211 and the second light L2_1 emitted from the second lamp 212 from being reflected by the internal air space.

In this exemplary embodiment, the first angle $\theta 1$ will be explained when the second light L2_1 from the second lamp 212 advances towards the first inclined surface 21 of the first guide recess 222a.

Referring to FIG. 6, an emitting angle of light emitted from a light emitting diode, generally, is in a range from about 70 degrees to about 80 degrees. Thus, the second light L2_1 is inclined in a second angle $\theta a$ with respect to a first imaginary line NL1 substantially parallel to the first end D1 of the light guide plate 220 and intersected with the second light L2_1 from the second lamp 212. The second angle $\theta a$ is substantially identical to the emitting angle from the second lamp 212.

Also, the second light L2_1 is inclined in a third angle $\theta b$ with respect to a second imaginary line NL2 substantially perpendicular to the first end D1 and intersected with the second light L2_1.

The first inclined surface 21 of the first guide recess 222a is inclined in a fourth angle $\theta c$ against the second imaginary line NL2. The first inclined surface 21 is inclined in a fifth angle $\theta 1\_2$ with respect to a third imaginary line NL3 substantially perpendicular to the first end D1 and intersected with the position that the first inclined surface 21 meets the second inclined surface 22. Since the second and third imaginary lines NL2 and NL3 are substantially parallel to each other, the fifth angle $\theta 1\_2$ is substantially identical to the fourth angle $\theta c$, and substantially identical to an angle bisecting the first angle $\theta 1$.

When a refraction angle of the second light L2_1 is about 90 degrees, the second light L2_1 is emitted along the first inclined surface 21.

Thus, an angle between the second light L2_1 and the first inclined surface 21, that is, an angle that is equal to an addition of the third angle $\theta b$ and the fourth angle $\theta c$ must be greater than or identical to a critical angle so as to totally reflect the second light L2_1.

The critical angle may be obtained using Snell's law as represented by equation 1 in below.

$$n2 \times \sin\theta a = n1 \times \sin\theta b \qquad \text{Equation 1}$$

As represented by the equation 1, a value that multiplies the refractive index n2 of the second medium M2 from which the light is emitted by the incident angle $\theta a$ is substantially equal to a value that multiplies the refractive index n1 of the first medium M1 into which the light is incident by the refraction angle $\theta b$.

Since the total reflection may be possible when the refraction angle $\theta b$ is about 90 degrees, the refraction angle $\theta b$ is 90 degrees as represented by equation 2 below.

$$n2 \times \sin\theta a = n1 \times \sin 90° \qquad \text{Equation 2}$$

As represented by the equation 2, the refractive index n2 of the second medium M2 indicates a refractive index of the light guide plate 220, and the refractive index n1 indicates a refractive index of the internal air space. The refractive index of the internal air space is about 1.00, and thus the incident angle $\theta a$, that is, the critical angle $\theta a$ is as represented by equation 3 below.

$$n2 \times \sin\theta a = n1 \times \sin 90°$$

$$\sin\theta a = n1/n2$$

$$\theta a = \sin^{-1}(n1/n2) \qquad \text{Equation 3}$$

As represented by the equation 3, the critical angle $\theta a$ is equal to an arcsin (n1/n2).

The light guide plate 220 may include various materials such as polymethyl methacrylate (PMMA) or polycarbonate (PC), etc. The PMMA has a refractive index of about 1.49 and the PC has a refractive index of about 1.59, so that the refractive index n2 of the light guide plate 220 depends upon the materials.

In case that the light guide plate 220 includes the PMMA, the critical angle $\theta a$ is as represented by equation 4 below.

$$1.49 \times \sin\theta a = 1 \times \sin 90°$$

$$\sin\theta a = 1/1.49 \approx 0.67$$

$$\theta a = \sin^{-1}(1/1.49) \approx 0.74 \approx 42° \qquad \text{Equation 4}$$

As represented by the equation 4, when the refractive index n2 of the light guide plate 220 is 1.49, the critical angle θa is about 42 degrees.

In case that the light guide plate 220 includes the PC, the critical angle θa is as represented by equation 5 below.

$$1.59 \times \sin\theta a = 1 \times \sin 90°$$

$$\sin\theta a = 1/1.59 \approx 0.67$$

$$\theta a = \sin^{-1}(1/1.59) \approx 0.68 \approx 40° \quad \text{Equation 5}$$

As represented by the equation 5, when the refractive index n2 of the light guide plate 220 is 1.59, the critical angle θa is about 40 degrees.

According to the critical angle θa, a value that is equal to an addition of the third angle θb and the fourth angle θc may be obtained by equation 6 represented in below.

$$\theta c = \theta a - \theta b \quad \text{Equation 6}$$

As represented by the equation 6, the fourth angle θc is equal to a subtraction of the third angle θb from the critical angle θa. In this exemplary embodiment, the critical angle θa and the third angle θb may be different due to the material of the light guide plate 220 and the emitting angle of the second light L2_1 from the second lamp 212, respectively. Thus, the fourth angle θc may be different according to the material of the light guide plate 220 and the emitting angle of the second light L2_1.

In case that the light guide plate 220 includes the PMMA, the fourth angle θc is as represented by equation 7 below.

$$\theta c = 42° - \theta b = 42° - (90° - \theta a) \quad \text{Equation 7}$$

As represented by the equation 7, the third angle θb may be calculated using the second angle θa that indicates the emitting angle of the second light L2_1 emitted from the second lamp 212. Since the emitting angle of the second light L2_1 is in a range from about 70 degrees to about 80 degrees, the third angle θb is about 20 degrees when the second angle θa is about 70 degrees, and the third angle θb is about 10 degrees when the second angle θa is about 80 degrees. Thus, in case that the light guide plate 220 includes the PMMA, the fourth angle θc is in a range from about 22 degrees to about 33 degrees.

In case that the light guide plate 220 includes the PC, the fourth angle θc is as represented by equation 8 below.

$$\theta c = 40° - \theta b = 40° - (90° - \theta a) \quad \text{Equation 8}$$

As represented by the equation 8, the third angle θb is about 20 degrees when the second angle θa is about 70 degrees, and the third angle θb is about 10 degrees when the second angle θa is about 80 degrees. Thus, in case that the light guide plate 220 includes the PC, the fourth angle θc is in a range from about 20 degrees to about 30 degrees.

The fourth angle θc is equal to the fifth angle θ1_2, and the fifth angle θ1_2 is equal to an angle θ1_1 between the third imaginary line NL3 and the second inclined surface 22.

The first angle θ1 may vary in accordance with the refractive index of the light guide plate 220 because the fifth angle θ1_2 may vary according to the refractive index of the light guide plate 220. In case that the light guide plate 220 includes the PMMA, the first angle θ1 is in a range from about 45 degrees to about 65 degrees. In case that the light guide plate 220 includes the PC, the first angle θ1 is in a range from about 40 degrees to about 60 degrees.

The first guide surface 233a located at a position adjacent to the first receiving recess 221a guides the second light L2_1 emitted from the first lamp 211 to the light guide area D3. Also, the second guide surface 233b (refer to FIG. 3) located at a position adjacent to the third receiving recess 221c guides the third light L2_2 emitted from the lamp 213 to the light guide area D3.

The first and second guide surfaces 233a and 233b border an external air space, so that it is preferable to reduce light amount reflected towards the external air space among the second light L2_1 incident into the first guide surface 233a from the first lamp 211 and the third light L2_2 incident into the second guide surface 233b from the third lamp 213.

The first guide surface 233a is inclined by the fifth angle θ1_2 against a fourth imaginary line NL4 substantially perpendicular to the first end D1, thereby totally reflecting the second light L2_1. Similarly, the second guide surface 233b is inclined by the fifth angle θ1_2 with respect to a fifth imaginary line (not shown) substantially perpendicular to the first end D1 so that the third light L2_2 is totally reflected.

Thus, in case that the light guide plate 220 includes the PMMA, the first and second guide surfaces 233a and 233b are inclined by an angle in a range from about 22 degrees to about 33 degrees with respect to the fourth and fifth imaginary lines, respectively. Also, in case that the light guide plate 220 includes the PC, the first and second guide surfaces 233a and 233b are inclined by an angle in a range from about 20 degrees to about 30 degrees with respect to the fourth and fifth imaginary lines, respectively.

As described above, the light guide plate 220 includes the first and second guide recesses 222a and 222b and the first and second guide surfaces 233a and 233b to guide the second and third lights L2_1 and L2_2 from the first, second and third lamps 211, 212 and 213 to the light guide area D3. Thus, the light amount leaked from the light guide plate 220 among the lights provided from the first, second and third lamps 211, 212 and 213, the light guide plate 220 may be reduced, thereby improving the light efficiency and display quality of the liquid crystal display apparatus 400.

Figure 7:
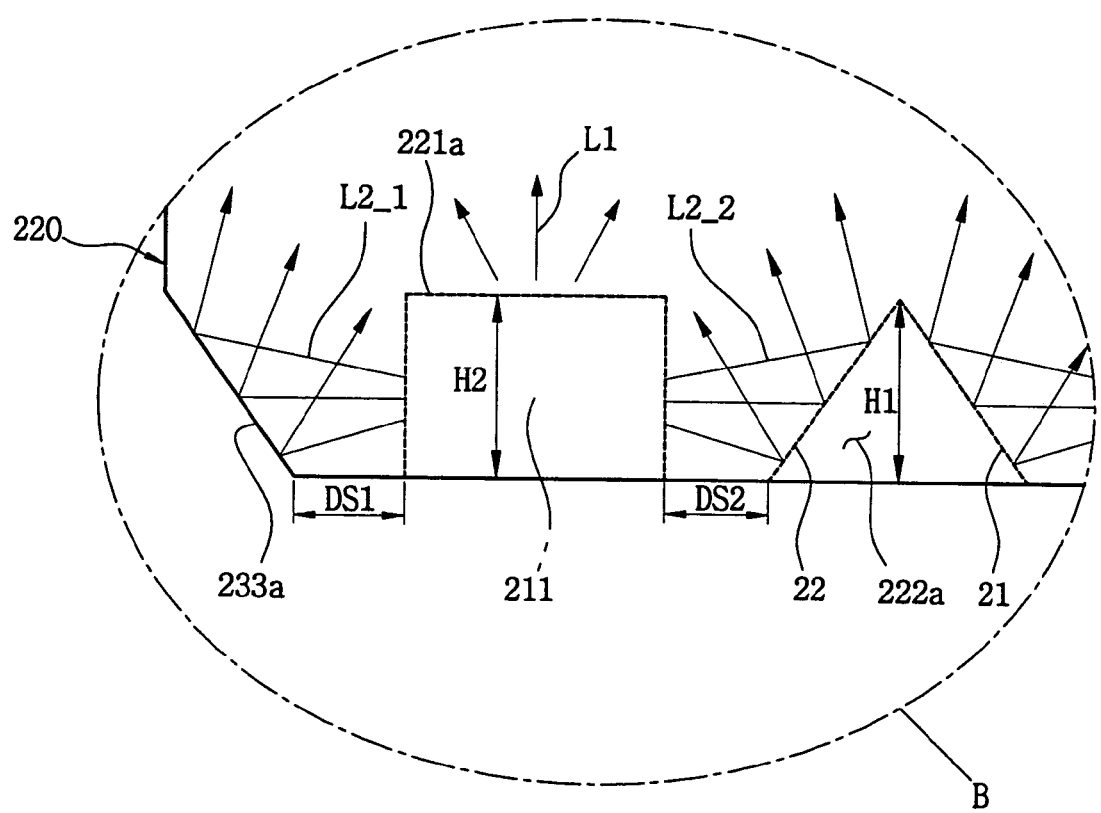
FIG. 7 is an enlarged view showing a portion "B" in FIG. 4.

FIG. 7 is an enlarged view showing a portion "B" in FIG. 4.

Referring to FIG. 7, the first receiving recess 221a (refer to FIG. 3) is disposed between the first guide surface 233a and the second inclined surface 22 of the first guide recess 222a. The second and third lights L2_1 and L2_2 emitted from the first lamp 211 are reflected by the first guide surface 233a and the second inclined surface 22 of the first guide recess 222a towards the light guide area D3.

When distances between a position where the second and third lights L2_1 and L2_2 are emitted from the first lamp 211 and the first guide surface 233a, and between the position where the second and third lights L2_1 and L2_2 are emitted from the first lamp 211 and the second inclined surface 22 of the first guide recess 222a are shortened, the light amount leaked from the light guide plate 220 may be reduced.

Thus, it is preferable to shorten an interval DS1 between the first receiving recess 221a into which the first lamp 211 is received and the first guide surface 223a, and an interval DS2 between the second inclined surface 22 of the first guide recess 222a and the first receiving recess 221a.

In order to guide the third light L2_2 emitted from the first lamp 211 to the light guide area D3, the first guide recess 222a includes a depth H1 identical to or deeper than a depth H2 of the first receiving recess 221a into which the first lamp 211 is received.

Figure 8:
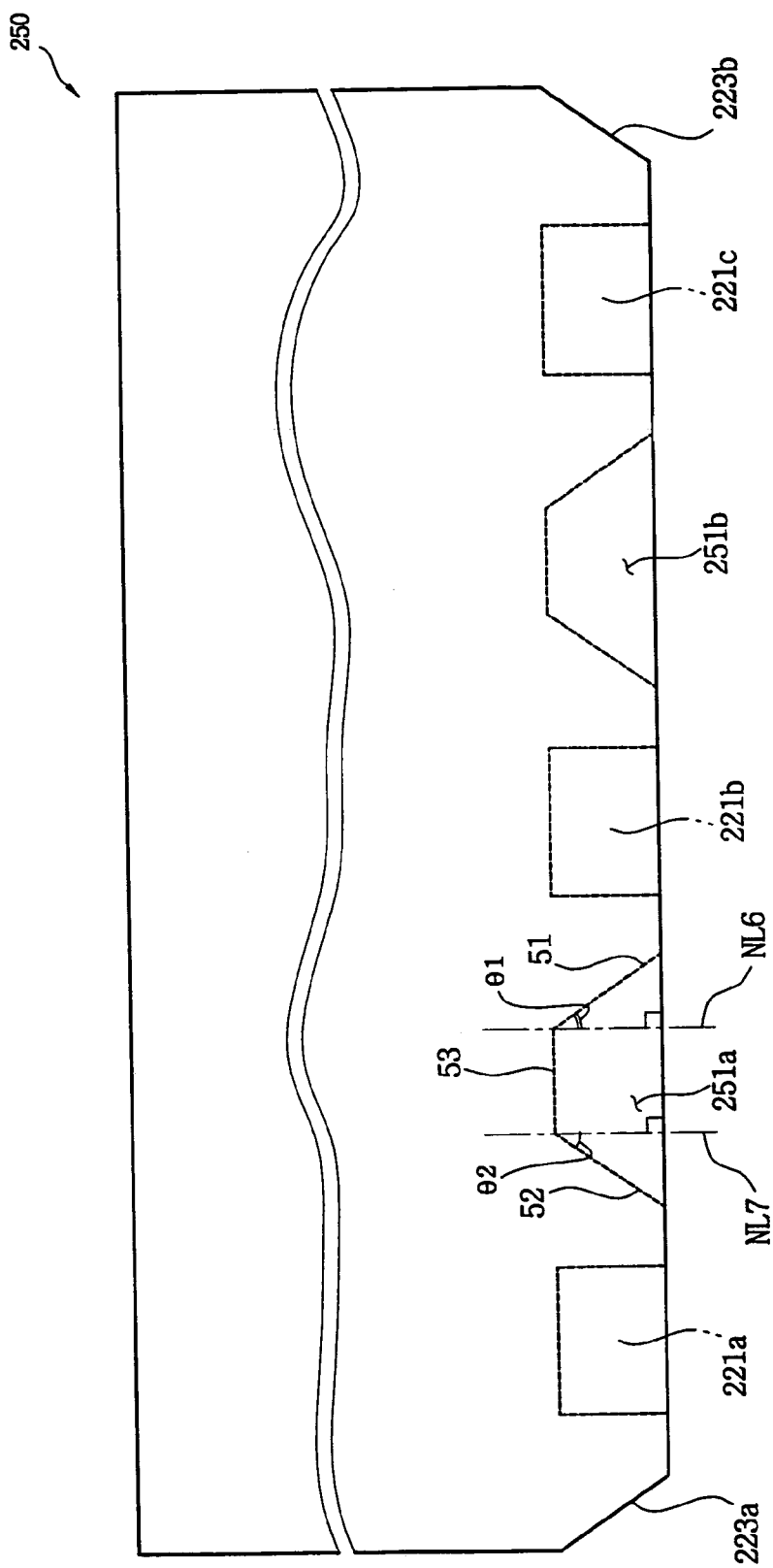
FIG. 8 is a plan view showing a light guide plate according to another exemplary embodiment of the present invention.

FIG. 8 is a plan view showing a light guide plate according to another exemplary embodiment of the present invention. In FIG. 8, the same reference numerals denote the same elements in FIG. 4, and thus the detailed descriptions of the same elements will be omitted.

Referring to FIG. 8, a light guide plate 250 includes a first receiving recess 221a, a second receiving recess 221b and a third receiving recess 221c so as to receive a first lamp 211, a second lamp 212 and a third lamp 213, respectively, and a first guide recess 251a and a second guide recess 251b so as to guide a second light L2_1 and a third light L2_2 (refer to FIG. 4) emitted from the first, second and third lamps 211, 212 and 213 to a light guide area D3 (refer to FIG. 4).

Particularly, the first guide recess 251a is disposed between the first and second receiving recesses 221a and 221b, and the second guide recess 251b is disposed between the second and third receiving recesses 221b and 221c. The first and second guide recesses 251a and 251b guide the second and third lights L2_1 and L2_2 provided from the first, second and third lamps 211, 212 and 213 to the light guide area D3.

In order to guide the second and third lights L2_1 and L2_2 emitted from the first and second lamps 211 and 212 to the light guide area D3, the first guide recess 222a includes a first inclined surface 51, a second inclined surface 52 and a third surface connecting the first and second inclined surfaces 51 and 52.

The first inclined surface 51 adjacent to the second receiving recess 221b guides the second light L2_1 emitted from the second lamp 212 to the light guide area D3. The second inclined surface 52 adjacent to the first receiving recess 221a guides the third light L2_2 emitted from the first lamp 211 to the light guide area D3.

The first inclined surface 51 is inclined by a predetermined angle with respect to a sixth imaginary line NL6 that is substantially perpendicular to a first end D1 of the light guide plate 250 and intersected with the first inclined surface 51. The second inclined surface 52 is inclined by a predetermined angle against a seventh imaginary line NL7 that is substantially perpendicular to the first end D1 and intersected with the second inclined surface 52.

A first angle θ1 between the first inclined surface 51 and the sixth imaginary line NL6, and a second angle θ2 between the second inclined surface 52 and the seventh imaginary line NL7, are equal to the fifth angle θ1_2 shown in FIG. 4.

Thus, in case that the light guide plate 250 includes a PMMA, the first angle θ1 between the first inclined surface 51 and the sixth imaginary line NL6, and the second angle θ2 between the second inclined surface 52 and the seventh imaginary line NL7, are in a range from about 22 degrees to about 33 degrees. Also, in case that the light guide plate 250 includes a PC, the first angle θ1 between the first inclined surface 51 and the sixth imaginary line NL6, and the second angle θ2 between the second inclined surface 52 and the seventh imaginary line NL7, are in a range from about 20 degrees to about 30 degrees.

In this exemplary embodiment, the first guide recess 251a includes structure substantially identical to that of the second guide recess 251b. Thus, the first guide recess 251a will be explained in detail, and a detailed description of the second guide recess 251b will be omitted.

Both corners of the first end D1 of the light guide plate 250 are chamfered so as to form a first guide surface 223a and a second guide surface 223b, respectively. The first and second guide surfaces 223a and 223b reflect the second and third lights L2_1 and L2_2 emitted from the first and third lamps 211 and 213, respectively, to the light guide area D3 of the light guide plate 220.

According to the present invention, the light guide plate includes the receiving recesses into which the light emitting diode is received, and guide recesses disposed between the receiving recesses. Although the light emitting diode is used as a light source, the light emitted from the light emitting diode may be guided to the light guide area of the light guide plate by the guide recesses.

As a result, the light guide plate may prevent leakage of the light provided to the light guide plate from the light emitting diode, thereby improving display quality of the liquid crystal display apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising;
a light source to emit a first light and a second light; and
a light guide plate including a receiving recess formed at a first end thereof so as to receive the light source, and a guide recess formed at a position adjacent to the receiving recess so as to guide the second light to a second end opposite to the first end of the light guide plate,
wherein the first light is provided to the second end of the light guide plate and the second tight is provided to the second end of the light guide plate after reflected from the guide recess,
wherein the guide recess comprises a first inclined surface that is inclined to a first direction with respect to the first end of the light guide plate such that the second light from the light source is reflected to the second end of the light guide plate, and
wherein the first inclined surface is inclined by an angle of a range from about 22 degrees to about 33 degrees with respect to an imaginary line that is substantially perpendicular to the first end of the light guide plate and intersected with the first inclined surface, and the light guide plate has a refractive index of about 1.49.

2. A backlight assembly comprising:
a light source to emit a first light and a second light; and
a light guide plate including a receiving recess formed at a first end thereof so as to receive the light source, and a guide recess formed at a position adjacent to the receiving recess so as to guide the second light to a second end opposite to the first end of the light guide plate,
wherein the first light is provided to the second end of the light guide plate and the second light is provided to the second end of the light guide plate after reflected from the guide recess,
wherein the guide recess comprises a first inclined surface that is inclined to a first direction with respect to the first end of the light guide plate such that the second light from the light source is reflected to the second end of the light guide plate, and
wherein the first inclined surface is inclined by an angle of a range from about 20 degrees to about 30 degrees with respect to an imaginary line that is substantially perpendicular to the first end of the light guide plate and intersected with the first inclined surface, and to light guide plate has a refractive index of about 1.59.

3. A backlight assembly comprising:
a light source to emit a first light and a second light; and
a light guide plate including a receiving recess formed at a first end thereof so as to receive the light source, and to guide recess formed at a position adjacent to the receiving recess so as to guide the second light to a second end opposite to the first end of the light guide plate, wherein the first light is provided to the second end of the light guide plate and the second light is provided to the second end of the light guide plate after reflected from the guide recess, wherein the guide recess comprises:

a first inclined surface that is inclined to a first direction with respect to the first end of the light guide plate such that the second light from the light source is reflected to the second end of the light guide plate and a second inclined surface that is inclined to a second direction different from the first direction with respect to the first end of the light guide plate such that the second light from the light source is reflected to the second end of the light guide plate, and wherein the second inclined surface is inclined by an angle of a range from about 22 degrees to about 33 degrees with respect to an imaginary line that is substantially perpendicular to the first end of the light guide plate and intersected with the first inclined surface, and the light guide plate has a refractive index of about 1.49.

4. A backlight assembly comprising:

a light source to emit a first light and a second light; and a light guide plate including a receiving recess formed at a first end thereof so as to receive the light source, and a guide recess formed at a position adjacent to the receiving recess so as to guide the second light to a second end opposite to the first end of the light guide plate, wherein the first light is provided to the second end of the light guide plate and the second light is provided to the second end of the light guide plate after reflected from the guide recess, wherein the guide recess comprises:

a first inclined surface that is inclined to a first direction with respect to the first end of the light guide plate such that the second light from the light source is reflected to the second end of the light guide plate and a second inclined surface that is inclined to a second direction different from the first direction with respect to the first end of the light guide plate such that the second light from the light source is reflected to the second end of the light guide plate, and wherein the second inclined surface is inclined by and angle of a range from about 20 degrees to about 30 degrees with respect to an imaginary line that is substantially perpendicular to the first end of the light guide plate and intersected with the first inclined surface, and the light guide plate has a refractive index of about 1.59.

5. A backlight assembly comprising:

a light source to emit a first light and a second light; and a light guide plate including a receiving recess formed at a first end thereof so as to receive the light source, and a guide recess formed at a position adjacent to the receiving recess so as to guide the second light to the second end opposite to the first end of the light guide plate, wherein the first light is provided to the second end of the light guide plate and the second light is provided to the second end of the light guide plate after reflected from the guide recess, wherein the guide recess comprises:

a first inclined surface that is inclined to a first direction with respect to the first end of the light guide plate such that the second light from the light source is reflected to the second end of the light guide plate and a second inclined surface that is inclined to a second direction different from the first direction with respect to the first end of the light guide plate such that the second light from the light source is reflected to the second end of the light guide plate, and wherein the first and second inclined surfaces are intersected with each other, and the first and second inclined surfaces are inclined by an angle of a range from about 22 degrees to about 33 degrees with respect to an imaginary line that is substantially perpendicular to the first end of the light guide plate and intersected with a position where the first inclined surface intersects with the second inclined surface.

6. The backlight assembly of claim 5, wherein the light guide plate comprises polymethylmethacrylate, and has a refractive index of about 1.49.

7. A backlight assembly comprising:

a light source to emit a first light and a second light; and a light guide plate including a receiving recess formed at a first end thereof so as to receive the light source, and a guide recess formed at a position adjacent to the receiving recess so as to guide the second light to a second end opposite to the first end of the light guide plate, wherein the first light is provided to the second end of the light guide plate and the second light is provided to the second end of the light guide plate after reflected from the guide recess, wherein the guide recess comprises:

a first inclined surface that is inclined to a first direction with respect to the first end of the light guide plate such that the second light from the light source is reflected to the second end of the light guide plate and a second inclined surface that is inclined to a second direction different from the first direction with respect to the first end of the light guide plate such that the second light from the light source is reflected to the second end of the light guide plate, and wherein the first and second inclined surfaces are intersected with each other, and to first and second inclined surfaces are inclined by an angle of a range from about 20 degrees to about 30 degrees with respect to an imaginary line that is substantially perpendicular to the first end of the light guide plate and intersected with a position where the first inclined surface intersects with the second inclined surface.

8. The backlight assembly of claim 7, wherein the light guide plate comprises polycarbonate and has a refractive index of about 1.59.

9. A backlight assembly comprising:

a light source to emit a first light and a second light; and a light guide plate including a receiving recess formed at a first end thereof so as to receive the light source, and a guide recess fanned at a position adjacent to the receiving recess so as to guide the second light to a second end opposite to the first end of the light guide plate, wherein the first light is provided to the second end of the light guide plate and the second light is provided to the second end of the light guide plate after reflected from the guide recess, wherein the guide recess comprises;

a first inclined surface that is inclined to a first direction with respect to the first end of the light guide plate such that the second light from the light source is reflected to the second end at the light guide plate, a second inclined surface that is inclined to a second direction different from the first direction with respect to the first end of the light guide plate such that the second light from the light source is reflected to the second end of the light guide plate and a third surface that connects the first inclined surface and the second inclined surface, and is substantially parallel to the first end of the light guide plate, wherein the first inclined surface is inclined by and angle of a range from about 22 degrees to about 33 degrees with respect to a first imaginary line that is substantially perpendicular to the first end of the light guide plate and intersected with a position where the first inclined surface intersects with the third surface, and wherein the second inclined surface is inclined by an angle of a range from about 22 degrees to about 33 degrees with respect to a second imaginary line that is substantially perpendicular to the first end of the light guide plate and intersected with a position where the second inclined surface intersects with the third surface.

10. The backlight assembly of claim 9, wherein the light guide plate comprises polymethylmethacrylate, and has a refractive index of about 1.49.

11. A backlight assembly comprising:

a light source to emit a first light and a second light; and a light guide plate including a receiving recess formed at a first end thereof so as to receive the light source, and a guide recess formed at a position adjacent to the receiving recess so as to guide the second light to a second end opposite to the first end of the light guide plate, wherein the first light is provided to the second end of the light guide plate and the second light is provided to the second end of the light guide plate after reflected from the guide recess, wherein the guide recess comprises;

a first inclined surface that is inclined to a first direction with respect to the first end of the light guide plate such that the second light from the light source is reflected to the second end of the light guide plate, a second inclined surface that is inclined to a second direction different from the first direction with respect to the first end of the light guide plate such that the second light from the light source is reflected to the second end of the light guide plate and a third surface that connects the first inclined surface and the second inclined surface, and is substantially parallel to the first end of the light guide plate, wherein the first inclined surface is inclined by an angle of range from about 20 degrees to about 30 degrees with respect to a first imaginary line that is substantially perpendicular to the first end of the light guide plate and intersected with a position where the first inclined surface intersects with to third surface, and wherein the second inclined surface is inclined by an angle of a range from about 20 degrees to about 30 degrees with respect to a second imaginary line that is substantially perpendicular to the first end of the light guide plate and intersected with a position where the second inclined surface intersects with the third surface.

12. The backlight assembly of claim 11, wherein the light guide plate comprises polycarbonate, and has a refractive index of about 1.59.

13. A backlight assembly comprising:

a light source to emit a first light and a second light; and a light guide plate including a receiving recess formed at a first end thereof so as to receive the light source, and a guide recess formed at a position adjacent to the receiving recess so as to guide the second light to a second end opposite to the first end of the light guide plate, wherein the first light is provided to the second end of the light guide plate and the second light is provided to the second end of the light guide plate after reflected from the guide recess, wherein both corners of the first end of the light guide plate are chamfered so as to reflect the second light emitted from the light source to the second end of the light guide plate, and wherein the chamfered surfaces of the both corners are inclined by an angle of a range from about 22 degrees to about 33 degrees with respect to an imaginary line that is substantially perpendicular to an extension line of the first end of the light guide plate and intersected with the chamfered surface.

14. The backlight assembly of claim 13, wherein the light guide plate comprises polymethylmethacrylate, and has a refractive index of about 1.49.

15. A backlight assembly comprising:

a light source to emit a first light and a second light; and a light guide plate including a receiving recess formed at a first end thereof so as to receive the light source, and a guide recess formed at a position adjacent to the receiving recess so as to guide the second light to a second end opposite to the first end of the light guide plate, wherein the first light is provided to the second end of the light guide plate and the second light is provided to the second end of the light guide plate after reflected from the guide recess, wherein both corners of the first end of the light guide plate are chamfered so as to reflect the second light emitted from the light source to the second end of the light guide plate, and wherein the chamfered surfaces of the both corners arc inclined by an angle of a range from about 20 degrees to about 30 degrees with respect to an imaginary line that is substantially perpendicular to an extension line of the first end of the light guide plate and intersected with the chamfered surface.

16. The backlight assembly of claim 15, wherein the light guide plate comprises polycarbonate, and has a refractive index of about 1.59.

17. A liquid crystal display apparatus comprising:

a liquid crystal display panel that receives a first light and a second light and displays an image using the first light and the second light;

a backlight assembly including;

a light source to emit the first light and the second light in response to power; and a light guide plate including a receiving recess formed at a first end thereof so as to receive the light source, and a guide recess formed at a position adjacent to the receiving recess so as to guide the first light and the second light to the liquid crystal display panel, wherein the first light is provided to the second end opposite to the first end of the light guide plate and the second light is provided to the second end of the light guide plate after reflected from the guide recess, wherein the guide recess comprises a first inclined surface inclined in a first direction with respect to the first end of the light guide plate so as to reflect the second light provided from the light source to the second end of the light guide plate, and wherein the first inclined surface is inclined by an angle of a range from about 22 degrees to about 33 degrees with respect to an imaginary line that is substantially perpendicular to the first end of the light guide plate and intersected with the first inclined surface.

18. The liquid crystal display apparatus of claim 17, wherein the light guide plate comprises polymethylmethacrylate.

19. A liquid crystal display apparatus comprising:

a liquid crystal display panel that receives a first light and a second light and displays an image using the first light and the second light;

a backlight assembly including;

a light source to emit the first light and the second light in response to power; and a light guide plate including a receiving recess formed at a first end thereof so as to receive the light source, and a guide recess formed at a position adjacent to the receiving recess so as to guide the first light and the second light to the liquid crystal display panel, wherein the first light is provided to the second end opposite to the first end of the light guide plate and the second light is provided to the second end of the light guide plate after reflected from the guide recess, wherein the guide recess comprises a first inclined surface inclined in a first direction with respect to the first end of the light guide plate so as to reflect the second light provided from the light source to the second end of the light guide plate, and wherein the first inclined surface is inclined by an angle of a range from about 20 to about 30 with respect to an imaginary line that is substantially perpendicular to the first end of the light guide plate and intersected with the first inclined surface.

20. The liquid crystal display apparatus of claim 19, wherein the light guide plate comprises polycarbonate.

21. A liquid crystal display apparatus comprising:

a liquid crystal display panel that receives a first light and a second light and displays an image using the first light and the second light;

a backlight assembly including;

a light source to emit the first light and the second light in response to power; and a light guide plate including a receiving recess formed at a first end thereof so as to receive the light source, and a guide recess formed at a position adjacent to the receiving recess so as to guide the first light and the second light to the liquid crystal display panel, wherein the first light is provided to the second end opposite to the first end of the light guide plate and the second light is provided to the second end of the light guide plate after reflected from the guide recess, wherein the guide recess comprises:

a first inclined surface inclined in a first direction with respect to the first end of the light guide plate so as to reflect the second light provided from the light source to the second end of the light guide plate and a second inclined surface inclined in a second direction different from the first direction so as to reflect the second light provided from the light source to the second end of the light guide plate, and wherein the second inclined surface is inclined by an angle of a range from about 22 degrees to about 33 degrees with respect to an imaginary line that is substantially perpendicular to the first end of the light guide plate and intersected with the second inclined surface.

22. A liquid crystal display apparatus comprising:

a liquid crystal display panel that receives a first light and a second light and displays an image using the first light and the second light;

a backlight assembly including;

a light source to emit the first light and the second light in response to power; and a light guide plate including a receiving recess formed at a first end thereof so as to receive the light source, and a guide recess formed at a position adjacent to the receiving recess so as to guide the first light and the second light to the liquid crystal display panel, wherein the first light is provided to the second end opposite to the first end of the light guide plate and the second light is provided to the second end of the light guide plate after reflected from the guide recess, wherein the guide recess comprises:

a first inclined surface inclined in a first direction with respect to the first end of the light guide plate so as to reflect the second light provided from the light source to the second end of the light guide plate and a second inclined surface in a second direction different from the first direction so as to reflect the second light provided from the light source to the second end of the light guide plate, and wherein the second inclined surface is inclined by an angle of a range from about 20 degrees to about 30 degrees with respect to an imaginary line that is substantially perpendicular to the first end of the light guide plate and intersected with the second inclined surface.

23. A liquid crystal display apparatus comprising:

a liquid crystal display panel that receives a first light and a second light and displays an image using the first light and the second light;

a backlight assembly including;

a light to emit the first light and the second light in response to power; and a light guide plate including a receiving recess formed at a first end thereof so as to receive the light source, and a guide recess formed at a position adjacent to the receiving recess so as to guide the first light and the second light to the liquid crystal display panel, wherein the first light is provided to the second end opposite to the first end of the light guide plate and the second light is provided to the second end of the light guide plate after reflected from the guide recess, wherein both corners of the first end of the light guide plate are chamfered so as to reflect the second light emitted from the light source to the second end of the light guide plate, and chamfered surface is inclined by an angle of a range from about 22 degrees to about 33 degrees with respect to an imaginary line that is substantially perpendicular to the first end of the light guide plate and intersected with the chamfered surface.

24. A liquid crystal display apparatus comprising:

a liquid crystal display panel that receives a first light and a second light and displays an image using the first light and the second light;

a backlight assembly including;

a light source to emit the first light and the second light in response to power; and a light guide plate including a receiving recess formed at a first end thereof so as to receive the light source, and a guide recess formed at a position adjacent to the receiving recess so as to guide the first light and the second light to the liquid crystal display panel, wherein the first light is provided to the second end opposite to the first end or the light guide plate and the second light is provided to the second end of the light guide plate after reflected from the guide recess, wherein both corners of the first end of the light guide plate are chamfered so as to reflect the second light emitted from the light source to the second end of the light guide plate, and wherein the chamfered surface is inclined by an angle of a range from about 20 degrees to about 30 degrees with respect to en imaginary line that is substantially perpendicular to the first end of the light guide plate and intersected with the chamfered surface.

* * * * *